US007282113B2

(12) United States Patent
Elgarhy et al.

(10) Patent No.: US 7,282,113 B2
(45) Date of Patent: Oct. 16, 2007

(54) METHOD FOR ENZYMATIC DEINKING OF WASTE PAPERS, THE WASTE PAPERS SO TREATED AND THE TREATING COMPOSITION

(75) Inventors: Yassin Elgarhy, Chomedey Laval (CA); Alexandre De Laryssa, St-Bruno (CA)

(73) Assignee: Tritexco, Inc., St-Eustache, Québec (CA)

( * ) Notice: Subject to any disclaimer, the term of this patent is extended or adjusted under 35 U.S.C. 154(b) by 156 days.

(21) Appl. No.: 10/989,389

(22) Filed: Nov. 17, 2004

(65) Prior Publication Data

US 2006/0102299 A1    May 18, 2006

(51) Int. Cl.
*D21C 5/02* (2006.01)
(52) U.S. Cl. ......................................... 162/5
(58) Field of Classification Search .................. 162/5
See application file for complete search history.

(56) References Cited

U.S. PATENT DOCUMENTS

| 3,047,452 | A | * | 7/1962 | De Vos ........................ 162/5 |
| 5,525,193 | A | | 6/1996 | Franks et al. | |
| 5,582,681 | A | * | 12/1996 | Back et al. .................... 162/72 |
| 5,879,509 | A | | 3/1999 | Sharyo et al. | |
| 6,241,849 | B1 | * | 6/2001 | Franks ........................ 162/5 |
| 2002/0179261 | A1 | * | 12/2002 | Franks et al. .................. 162/5 |
| 2003/0051836 | A1 | * | 3/2003 | Borch et al. ................... 162/72 |

FOREIGN PATENT DOCUMENTS

| CA | 2032256 | 2/2000 |
| CA | 2412757 | 12/2001 |

OTHER PUBLICATIONS

Kawagoshi, Y.; Fujita, M. "Purification and properties of the polyvinyl alcohol-degrading enzyme 2,4-pentanedione hydrolase obtained from Pseudomonas vesicularis var. povalolyticus PH", Rapid Science Publishers, 1998, World Journal of Microbiology & Biotechnology, vol. 14, pp. 95-100.*
Y. Kawagpshi, M. Fujita, Purification and properties of the polyvinyl alcohol-degrading enzyme 2,4-pentanedione hydrolase obtained from Pseudomonas vesicularis var. povalolyticus PH, 1998, Rapid Science Publishers, World Journal of Microbiology & Biotechnology, vol. 14, 95-100.*

* cited by examiner

Primary Examiner—Steven P. Griffin
Assistant Examiner—Michael J Felton
(74) Attorney, Agent, or Firm—Ogilvy Renault LLP

(57) ABSTRACT

The present invention relates to a deinking composition and a method of deinking wastepaper by using a mixture of enzymes that act on constituents of all three waste paper components involved in ink retention on final pulp. The first component represents substrates located on the surface and in the internal waste paper structure. The second component represents substrates located in the interface between paper and ink, usually formed by coatings or size-press (starch containing or not) applied layers. The third component represents substrates located in the ink and/or toner compounds. This method provides improved performance in relation to conventional methods, or current deinking with enzymes, which acts on a limited number of substrates involved in ink retention on final pulp.

42 Claims, 6 Drawing Sheets

METHOD FOR ENZYMATIC DEINKING OF WASTE PAPERS, THE WASTE PAPERS SO TREATED AND THE TREATING COMPOSITION

BACKGROUND OF THE INVENTION a) Field of the Invention

The present invention relates to enzymatic deinking of waste paper and a deinking composition.

b) Brief Description of Prior Art

Deinking represents primarily the process of extracting ink and toner from secondary fibre.

The traditional basic steps in conventional de-inking, that can be arranged in many different configurations, are described in part in TAPPI Journal pp. 101-106; D. R. Crow and R. F. Secor "The Ten Steps of Deinking " Jul. 1987. These steps are:

1) PULPING, usually done by batch and sometimes continuously. In this stage wastepaper and water are pulped for about 60 minutes, at about 55-70° C., at consistencies between 8-16% in the pulper. Stock consistency is subsequently dropped to around 4-5% before reaching the dump chest. Chemicals used mostly in the pulper stage and sometimes in some of the following stages are described in Pulp & Paper pp. 59-63;

T. W. Woodward" Appropriate Chemical Additives Are Key to Improved Deinking Operations" Nov., 1986. These chemicals are:

a) Sodium hydroxide at 3.0-5.0% on the fibre, for ink break-up through fibre swelling, for ink vehicle saponification and/or hydrolization and for ink dispersion.

b) Sodium silicates for wetting, peptization, ink dispersion and emulsification, alkalinity and buffering, peroxide stabilisation and preventing hydrolysis of soaps, at 2.0-6.0% on the fibre.

c) Hydrogen peroxide for oxidative bleaching and fibre yellowing prevention.

d) Fatty acids (e.g. stearic acid) at 0.5-3.0% on the fibre, as ink flotation aids.

e) Surfactants (e.g. ethoxylated linear alcohols or ethoxylated alkyl phenols) at 0.2-2.00% on the fibre, for ink removal, ink dispersion, wetting, emulsification, solubilization.

f) Sodium or potassium phosphates at 0.2-1.0% on the fibre as metal ion sequestrants, and for ink dispersion, alkalinity, buffering, detergency and peptization.

g) Sodium carbonate at 2.0-5.0% on the fibre for alkalinity, buffering and water softening.

h) Solvents (e.g. C1-C14 aliphatic saturated hydrocarbons) at 0.5-2.0% on the fibre for ink softening and salvation.

i) Hydrophilic polymers e.g. polyacrylates at 0.1-0.5% on the fibre, for ink dispersion and ink anti-redeposition or modified polyester resins as ink flotation aids.

2) PREWASHING, made by a de-watering screw that increases stock consistency from 4-5% (dump chest) to 14-16%. The effluent from this step is re-circulated to a chest used for pulper makeup. This effluent can be treated by additional devices such as:
   a) Sidehill-type screens for fine removal;
   b) Flotation cell for removing a large portion of ink and clay;
   c) Clarifier for fines, ink, and clay removal; and
   d) Settling tank for clay removal.

3) SCREENING, done by:
   a) Coarse screens—The stock is pumped through a centrifugal cleaner to a pressure screen with 1.5-2 mm diam holes. Rejects are deflaked and passed through a vibrating screen with 3-5 mm. diam. holes.
   b) Fine screens—The stock is pumped through medium density cleaners to remove staples, paper clips and other larger, heavier contaminants, to pressure screens with fine slots (0.25-0.35 mm). This system often has three to four stages. This screening system is the most effective against stickies.

4) THROUGH CLEANING (REVERSE CLEANING), made with through-flow cleaners and reverse cleaners with low-pressure drops (10-15 psi) and low hydraulic rejects (5-15%). Conventional systems consist of two to three stages. They are effective in removing stickies, plastics, styrofoam wax.

5) FORWARD CLEANING, having the purpose of removing contaminants too small for the fine slotted screens with a density that allows them to be accepted by medium density cleaners and through-flow cleaners (or reverse cleaners). These cleaners operate best at low stock consistency (e.g. 0.6%) and they are typically organized in three stages.

6) WASHING, done with the main purpose of removing small ink particles (less than about 50 microns). It is performed by washers of the following types:
   a) De-watering screws;
   b) Gravity deckers;
   c) Sidehill screens;
   d) Single wire devices;

7) FLOTATION, having the main purpose of removing bigger ink particles from pulp (up to about 200 microns). In this step, ink attaches preferentially (in relation to fibre) to air bubbles through a mechanism based on its hydrophobicity. The ink containing foam is subsequently removed to rejects.

8) DISPERSION targeting ink dispersion for size reduction and for release from fibre surface. Is effective for difficult to remove inks: ultraviolet inks, xerographic inks, jetprint inks. The mechanical action at medium consistencies (10-14%) or high consistencies (25-35%) is performed under temperature conditions of 120-190° F. This stage often has a chemical component. Dispersants can be very effective in reducing ink particles size and therefore help in a subsequent washing step.

9) BLEACHING done often in the pulper. Other bleaching points are after the heat and mechanical de-watering screw and/or after the last washer or flotation cell. Besides hydrogen peroxide already mentioned, some of the other common bleaching agents are sodium hydrosulfite, FAS (formamidine sulfinic acid) and sodium hypochlorite.

10) WATER RECIRCULATION, MAKEUP AND WASTE HANDLING representing the final step. Water recirculation is possible through clarifiers that remove ink, fillers fines and stickies, usually by DAF (dissolved air flotation) and using retention polymers. Makeup water originates from clarifiers and from outside sources: paper machine white water and fresh water. Bleeding a minimum flow from the system is essential for controlling dissolved solids. Solid waste represents another important issue.

During the last fifteen years several synergistic evolutionary developments modified the conventional approach to deinking, as mentioned in part in PaperAge; K. Patrick" Advances in Paper Recycling Technologies" Jul. 2001, O'Brien Publications, Inc.

These recent advances are:

1) IN PULPING. High consistency pulpers allow better ink detachment, lower pulping
   time and better ink particle dispersion. They allow, together with improved de-inking chemicals:
   a) Pulping with simplified chemical treatment (e.g. sodium hydroxide and surfactant
      or surfactant and silicate only),
   b) Extremely low dosages for the chemicals still used (e.g. surfactants at 0.01% on
      the fibre, while the traditional level was 0.20-2.00%)
   c) Only surfactant based chemistry,
   e) No deinking chemistry at all,
   f) Lowering pulping temperature at around 35° C.,
   g) Reducing pulping time at about 15-25 minutes Also, drum pulpers (continuous batch system) became predominant in newly built mills due to a gentler mechanical action that allows ink particles to remain initially larger and therefore generate an increased efficiency for the initial screening step. This improves subsequently the entire deinking process.

Treating pulp with enzymes that dislodge and remove ink in the pulper or later in the process, was shown in CA2032256 (Korea Research Institute of Chemical Technology) to reduce the use and unwanted effects of traditional chemicals. Similar results were obtained with starch degrading enzymes as described in U.S. Pat. No. 5,879,509 (Novonordisk AS).

2) PREWASHING. The importance of this step diminishes in the context of the overall de-inking technology improvements.

3) SCREENING. The major evolution in this deinking step was the reduction of fine screens from 0.25-0.35 mm to slots as small as 0,1 mm. This improved contaminant removal and overall efficiency of the system.

4) REVERSE CLEANING. A better screening and forward cleaning impacts on the use of reverse cleaners. Many plants, excepting OCC (old corrugated cardboard) plants, are shutting them down.

5) FORWARD CLEANING. Today's centrifugal cleaners used early in the system are typically smaller in diameter and are designed to remove bigger sized contaminants while operating at higher consistencies. Later in the process cleaners become even smaller.

6) WASHING. This step is losing some of its importance because of flotation improvements and because of high level of fine loss in traditional de-inking. New vacuum washers in ONP are retaining more fillers and fines.

7) FLOTATION. The latest flotation cells are completely redesigned (e.g. novel air injection nozzles that significantly improve bubble size distribution) and provide ink removal efficiencies unsurpassed historically.

8) DISPERSION. OCC and SOW (sorted office waste) plants are still relying on mechanical dispersion through dispergers or kneaders. As in pulping, or flotation, better surfactants brought lower chemical dosages for better ink-size particle reduction and ink removal.

9) BLEACHING. Today the most efficient bleaching for de-inked pulps seems to involve a pressurised oxygen-peroxide stage. Sodium hypochlorite is used less and less for environmental reasons, while a reduced number of plants are using chlorine dioxide. Ozone is rarely used. Hydrogen peroxide, sodium hydrosulfite and FAS are still widely used.

10) WATER RECIRCULATION, MAKEUP WATER AND WASTE HANDLING.

Improved control over clarifiers and retention polymer addition and performance are helping maintaining cleaner systems. Other ways to compensate for the increase in the volume of stickies entering the systems experienced in the last years are modern screening, cleaning, washing, flotation, mechanical dispersing and chemical solutions. These chemical solutions are:
   a) Pacification: rendering stickies less tacky (e.g. with talc, clay);
   b) Dispersion: reducing particle size (with dispersants);
   c) Solvating: dissolving particles (with solvents);
   d) Fixation: attaching stickies to the fibre (with cationic water soluble polymers).

A novel technology described by CA2412757 (Buckman Laboratories) that uses enzymes (lipases and/or esterases) also controls contaminants.

Enzymes are in this case mainly process chemicals having the purpose of reducing production problems related to contaminant deposits on machine surfaces, fabrics, wires, felts, and rolls.

The accelerated evolution of deinking in the last two decades shows clearly the need for any mechanical and/or chemical solutions that can improve any aspect of this process. This is due to a constant need to lower production cost with an increased product quality in the context of more and more closed mill effluent systems and increasing environmental concerns. However, one of the most important objectives of deinking remains extracting ink/toner from secondary fibre and a final pulp with the highest brightness and lowest visible remaining dirt possible remains a major priority for any de-inking mill. While today deinked pulp can be a cost-effective component in newsprint and tissue, it still has limited use (typically only 10-30% from the entire volume of pulp used) in grades of fine paper like printing and writing grades. In these grades the presence of small visible specks of ink are usually considered unacceptable.

Currently, enzymes are used for dislodging and removing ink particles from wastepaper, as described in CA 2032256 (Korea Research Institute of Chemical Technology) or by starch degrading action as described in U.S. Pat. No. 5,879,509 (Novonordisk AS).

The current enzymatic deinking is targeting one or some of the substrates involved in ink retention in the final pulp. Examples of these substrates are: cellulose, pectin, hemicellulose—especially xylan, amylose, amylopectin, and other carbohydrates. All these substrates are located mostly on the surface and in the internal waste paper structure and/or on the interface between paper and ink formed by starch containing coatings or size-press applied layers. Some of these substrates originate from the wood structure, including cellulose, pectin, hemicellulose—especially xylan, and other carbohydrates. Others, including amylose, and amylopectin were mainly added during paper or cardboard production, internally for dry strength and/or externally, usually as low cost binders in surface treatments.

The present invention improves current deinking with enzymes by improving results obtained through dislodging and removing ink particles and/or through starch degrading with a third general deinking mechanism: namely an ink/toner dispersing action.

SUMMARY OF THE INVENTION

It is an object of this invention to provide a method for deinking of waste paper. It is a further object of this invention to provide a deinking composition.

In accordance with one aspect of the invention there is provided a method for deinking of waste paper pulp comprising:

i) contacting a pulp of waste paper with at least a first enzyme which acts to dislodge ink and toner from the pulp, and at least a second enzyme which acts to disperse ink and toner in the pulp, ii) deinking said pulp with said enzymes, and iii) recovering a deinked pulp, said first enzyme acting on at least one of:

a) internal and surface substrates of said pulp, and b) interfacial substrates between the paper and ink and toner of the pulp, to dislodge ink and toner from said pulp; and said second enzyme acts to disperse substrates present in ink and toner in said pulp.

In accordance with another aspect of the invention there is provided a deinking composition for deinking waste paper pulp comprising:

i) at least a first enzyme which acts to dislodge ink and toner from the pulp; and ii) at least a second enzyme which acts to disperse ink and toner in the pulp; and said first enzyme acting on at least one of:

a) internal and surface substrates of said pulp, and b) interfacial substrates between the paper and ink and toner of the pulp, to dislodge ink and toner from said pulp; and said second enzyme acts to disperse substrates present in ink and toner in said pulp.

DETAILED DESCRIPTION OF THE INVENTION AND PREFERED EMBODIMENTS

Currently in deinking, waste papers having different stages of ageing are produced by: flexography, rotogravure, lithography, letterpress, xerography, ink-jet or laser; with ink setting methods based on: absorption, evaporation, oxidation, heat curing, ultra-violet curing, infrared hardening, precipitation gelation or cooling, are often pulped together in a slurry containing chemical and/or mechanical fibres.

Dislodging and removing the ink or degrading starch when present does not target the ink and toner compounds directly. This current deinking strategy is not targeting substrates present in ink pigments, and neither in the vehicles, which hold together the ink pigments, nor in the thermoplastic resin binders present in toners that do not contain vehicles, with enzymes only. Therefore, current methods of deinking with enzymes are incomplete.

This invention which adds a dimension related to targeting substrates present in ink compounds with enzymes, is extremely useful in practical mill conditions where often it is extremely difficult to control the waste paper quality and exact components, and where the level of surfactants needs to be kept at a minimum level.

This invention is based on a synergy obtained between enzymes selected for their ability to act on all levels involved in ink retention in the final pulp. This approach dramatically improves the action of enzymes involved in dislodging and removing ink and/or which are starch-degrading and outperforms by far the action of enzymes that act on the ink and toner compounds only. Brightness and visible dirt count results obtained in laboratory have been confirmed on mill scale trials in a plant which typically produces around 250 tons/day of deinked pulp.

Printing Inks

Printing inks represent important issues in conventional and/or enzymatic deinking processes. Their morphology and the printing method have a major impact on the deinking efficiency. Inks are generally made up of large variety of substrates. Some of these substrates can be found in:

1) Colorants which can be dyes (particles are soluble in the vehicles—used less frequently) or pigments (particles are dispersed in the vehicles). Pigments can be inorganic (titanium dioxide, carbon black, aluminium, brass) or organic (phthalocyanine and azo pigments). Carbon black is used for black ink formulations while organic pigments are used for coloured inks (phthalocyanine pigments for green and blue shades, azo pigments for red and yellow shades).

2) Vehicles which represent the liquid portion of ink, are responsible for almost all ink characteristics except colour and sometimes opacity, and contain:

Binders or resins:

of natural origin such as rosin, mostly abietic acid partially esterified with triglycerides that in order to be used must be chemically modified, e.g. esterified with glycerol or reacted with maleic or fumaric acid anhydrides.

Other natural resins are asphalt the residue from crude oil or coal tar distillation, or shellac an aliphatic polyester resulting from an insect secretion.

Semi-synthetic resins such as alkyd esters obtained by modifying phthalic acid esters and glycerol with fatty acids, or chemically modified cellulose.

Synthetic resins such as: acrylic, acrylamide resins, vinyls especially polyvinyl acetate or polyvinyl alcohol, phenolic resins, polyamides, polyurethane resins and epoxy resins.

Solvents which are totally or partially removed in the drying process: such as water, toluene, xylene, acetone, methyl ethyl ketone, methyl isobuthyl ketone, ethyl acetate, isopropyl acetate, n-propyl acetate, isobutyl acetate, methoxy propanol, ethoxy propanol, methanol, ethanol, iso-propanol, n-propanol, mineral spirits. Mineral oil, fatty acid monoesters of vegetable origin, drying oils (some vegetable oils) are also used for their diluting properties.

Other additives: such as optical brighteners, driers (cobalt or manganese compounds), anti-skinning agents (phenols), thixotropy promoters (increased fluidity for increased solution agitation—obtained with finely dispersed silicid acid, hydrated castor oil, etc), adhesion promoters (e.g. titanium chelates), waxes (polyethylene waxes, other hydrocarbon waxes, Teflon (trade-mark) waxes, beeswax and carnauba wax), plasticizers (esters of medium sized alcohols with phthalic acid e.g. diocyl phtalate, citric acid, stearic acid), anti-rub and slip additives (e.g. polytetrafluorethylene) surfactants, defoamers, biocides and deodorants.

In addition to the large variety of ink substrates, printing methods, described in part in TAPPI Journal pp. 85-89; A. Shrinath, J. T. Szewczak, I. J. Bowen "A review of ink-removal techniques in current deinking technology" Jul. 1991, are also important issues related to deinking:

1) Letterpress used for newspapers, magazines and kraft bags is transferring ink from the raised surface of a printing plate to paper. The ink setting methods are: absorption (no drying—oil penetrates in paper pores while pigments remain at the paper surface), evaporation (drying occurs when volatile solvents evaporate from ink), or precipitation (binders precipitate into a hard film after steam, water or chemical treatment).
2) Lithography (offset) used for magazines, books, art and photographic reproductions, and newspaper, usually transfers ink from the plate to a blanket-covered roll, which imparts the image to the sheet. The transfer is based on the oil-based receptivity of the image created by ink. The non-image areas are water receptive and repel ink. Ink setting methods are heat-set (heat polymerises resins present in ink) and evaporation, ultraviolet curing (usually acrylic monomers polymerise upon exposure to UV radiation), oxidation (combination between absorption and polymerisation of the oil or resin in the vehicle), and infrared hardening (through heating).
3) Rotogravure used for colour newspaper supplements, cartons, wrappers, transfers ink from recessed areas in the plate, while maintaining the rest of the plate clean by using doctor blades. Ink setting methods are based on evaporation often by heat, the inks being usually based on polyamide or polyacrylate resins in aromatic hydrocarbon or ester solvents.
4) Flexography, a particular letterpress case in which plates are softer (flexographic plates) used for newsprint, usually uses alcohol-ester vehicles (ink setting method: evaporation) or even water based vehicles (ink setting method: evaporation and absorption)
5) Xerography, an indirect printing method used for office paper. Ink is replaced by toner consisting of pigments (e.g. carbon black) in a thermoplastic resin binder (polystyrene-butadiene, polystyrene-acrylate, polyester, polyester imide, etc.). Sometimes toners contain also zinc stearate (dry lubricant), resins or oils as charge control agents. The image is formed on a charged photo-conductive surface by light and transferred to paper.
6) Ink-jet printing used for office papers, creates images by controlled projection of ink droplets onto the paper. For this purpose ink has to have an extremely low viscosity and dries quickly. Ink usually consists of soluble dyes in water or alcohol, glycols, polyethers, wetting agents.
7) Laser printing used for office papers is similar to xerography with the difference that the image is formed with the aid of a laser beam on a charged drum before being transferred to paper and ink is fixed more rapidly using a combination of heat and pressure. Toners are similar to those used in xerography.

The multiple combinations resulting from ink and toner formulations and printing methods generates different ink removal characteristics. Traditional deinking chemistry has difficulties in removing toners resulting from xerography or laser printing, or ink resulting from heat-set or ultraviolet printing. Conventional enzymatic strategies improve deinking performance with difficult waste material. However enzymes used in the prior art, are acting on substrates that promote ink dislodging and removal and/or starch degradation. They do not directly target the ink and toner composition itself. They target substrates such as: cellulose, pectin, hemicellulose, especially xylan, amylose, amylopectin, and other carbohydrates located mostly on the surface and in the internal waste paper structure and/or on the interface between paper and ink formed by starch containing coatings or size-press applied layers.

It is well known that one of the most important characteristics of enzymatic action is substrate specificity and enzymes acting alone in a deliberate strategy on major substrates present in ink and toner compounds were less successfully applied in deinking systems, in the prior art.

Esterases and/or lipases as described in CA2412757 (Buckman Laboratories), while improving contaminant control, represent one example of ink substrates targeting enzymes that have poor deinking performance in comparison with current enzymatic techniques.

Lipases as described in CA2434304 (Novozymes North America Inc.) need the presence of a fatty acid ester in the pulping stage in order to obtain the desired results.

Also, U.S. Pat. No. 6,241,849 (Novo Nordisk Biochem North America) describes the use of ink dislodging enzymes for deinking in conjunction with laccases for decolorizing. However in this case decolorizing dyes or pigments does not represent deinking (mainly removal of ink).

Surprisingly, while investigating the deinking effect of different enzymes acting on different ink and toner substrates, the existence of a synergy of enzymatic ink dislodging and removal and/or starch degrading, with enzymatic ink and toner targeting in deinking, has been found.

An example of an enzyme acting on other ink/toner substrates that would qualify as a de-inking enzymatic agent (through ink and toner dispersion), Trizym RX3 (trade-mark) from Tri-Tex Co. Inc. and which contains ester hydrolase activities, was tested for its potential ability to target the following substrates: ester components of rosin, shellac, alkyd esters, styrene-acrylics, acrylamide resins, other acrylics, polyvinyl acetates, polyesters, polyester imides, fatty acid monoesters of vegetable origin, drying oils, hydrated castor oil, esters of medium sized alcohols with phthalic acid, citric acid, and stearic acid. Another example of an enzyme acting on ink and toner that would qualify as a deinking agent (through ink and toner dispersion), Trizym RM11 (trade-mark) from Tri-Tex Co. Inc. was chosen for its ability to increase polyvinul alcohol solubility, as a result of its oxidase activities.

The preferred embodiment of this invention concerns deinking any type or combinations of printed, or printed and unprinted waste papers, including waste paper containing ONP (old newspapers) and/or OWP (office waste papers) and/or OMG (old magazines) and/or HGD (high-grade deinking) and/or MP (mixed paper) and/or PS (pulp substitutes). Examples of these waste paper grades are: news, special news, special news de-ink quality, over-issue news, magazines, mixed groundwood shaving, telephone directory, white blank news, groundwood computer printout, publication blanks, flyleaf shavings, hard white shavings, hard white envelope cutting, new coloured envelope cutting, semi-bleached cuttings, manila tabulating cards, sorted office paper, mixed office paper, sorted coloured ledger, manifold coloured ledger, sorted white ledger, manifold white ledger, computer printout, coated groundwood sections, printed bleached board cuttings, misprint bleached board, unprinted bleached board, bleach cup stock, printed bleached cup stock, unprinted bleached plate stock, printed bleached plate stock, super mixed paper, box board cuttings, and mill wrappers.

In the preferred embodiment of this invention the three wastepaper components involved in ink retention in final pulp (1. internal and surface substrates or, 2. interface between paper and ink and toner, 3. ink and toner) are attacked by enzymatic action simultaneously or in different addition points.

Enzyme addition in the initial pulping stage for enzyme formulations targeting substrates in wastepaper components 1,2, is indicated for increased substrate—enzyme contact. Enzyme formulation targeting substrate 3, could be maintained in the pulping stage, or added after the initial screening or even after flotation, especially if washing follows flotation and the slurry temperature and pH allow optimal enzyme activity. In this latter version of the preferred embodiment enzyme deinking synergy is obtained at the addition of the enzyme formulation targeting substrate 3 when enzymatic ink dispersion does not interfere with modern pulping screening and flotation and creates good conditions for ink removal through washing. From this addition point all enzymes are present in the deinking system Enzymes Suitable enzyme dosage ranges are:

for the enzyme formulation targeting substrates in waste paper component 1: 0.00001-2.0% catalytic protein on the dry waste paper weight, for the enzyme formulation targeting substrates in wastepaper component 2: 0.00001-2.0% catalytic protein on the dry waste paper weight, for the enzyme formulation targeting substrates in wastepaper component 3: 0.00001-1.0% catalytic protein on the dry waste paper weight, Suitable enzymes for dislodging ink and toner acting on substrates a) and b) or 1, 2 are selected from the group consisting of hydrolases, for example cellulases, amylases, pectinases, pullulanase, hemicellulases, proteases; oxidoreductases, for example glucose oxidase; transferases for example cyclodextrin glycosyltransferases; lyases for example pectate-lyase; isomerases for example glucose isomerase and mixtures thereof.

Especially preferred for dislodging ink and toner is a combination of cellulase and amylase; especially preferred for dipersing ink and toner is an ester hydrolase.

Deinking is carried out in an aqueous pulp slurry. However, the enzymes may be added prior to a pulping stage forming the pulp. It is possible to add to the furnish enzymes in liquid or powder form in water soluble or repulpable containers or bags during the furnish preparation before pulping. Depending on the stability of particular enzymes and dosages involved it is also possible to add enzymes directly to the furnish as early as inside the waste paper bales, even before the furnish reaches the deinking mill.

The enzymes may be added during such a pulping stage or after such a pulping stage.

The first and second enzymes may be added in the same or different stages of the deinking method.

Suitably the enzymes are contacted with the furnish or pulp at a temperature between about 0° C. and about 80° C.; at a pH of about 3 to about 11 and at a consistency between dry furnish to 0.5%, by weight pulp in an aqueous vehicle. More preferably the contacting temperature is between 25-65° C., the contacting pH is 5 to 10 and the contacting consistency is 1 to 20%.

The contacting of the pulp and enzymes may typically be for a period of about 1 minute to 4 weeks, more usually 5 minutes to 6 hours.

Generally the pulp is in an aqueous vehicle.

The deinking with the enzymes in accordance with the invention can optimally be carried out in conjunction with deinking with at least one traditional deinking chemical, such deiking chemical being added to the pulp. Suitable deinking chemicals include surfactants, caustic soda, fatty acids or fatty acid derivatives, sodium silicate, solvents, polymers and sodium carbonate. The deinking chemical may also be a bleaching or discolorizing chemical as used in an oxidation or reduction system, for example oxygen, ozone, hydrogen peroxide, sodium hypochlorite, chlorine dioxide, sodium hydrosulfite and FAS.

It will be understood that the first and second enzymes herein are different enzymes directed to different purposes as explained hereinbefore. Nevertheless the first and second enzymes can be different enzymes of the same class, for example they may both be hydrolases.

It is also known in the recent state of the art that enzymes used in deinking systems have other effects on the pulp, the paper made of this pulp, pulp and paper machines and effluent characteristics for example on yield, ash, retention, fibre strength, bulk, softness, stickies, friction coefficient, porosity, opacity, absorbency, required refining, drainage, "picking", machine cleanliness, BOD, COD levels.

The deinking with enzymes in accordance with the invention may have an impact on any of these factors, depending on each particular enzyme and combinations.

Moreover, by using specific enzymes besides deinking enzymes any of this objectives can be deliberately targeted and improved along with increased brightness and reduced visible dirt count.

Examples of the use of cellulases, amylases, proteases, pectinases, xylanases, lipases, esterases, peroxidases catalases, in order to adjust these factors related to pulp, the paper made of this pulp, pulp and paper machine cleanliness and effluent characteristics can be found in part in American Chemical Society Chapter 1; T. K. Kirk and T. W. Jeffries "Roles for Microbial Enzymes in Pulp and Paper Processing" 1996.

The deinking with the enzymes may additionally be conveniently carried out with the addition of a specific enzyme added for the one or more purposes from among a) yield increase;
b) ash or first pass retention change;
c) cationic demand reduction;
d) fibre strength change;
e) bulk change;
f) softness change;
g) stickes reduction;
h) friction coefficient change;
i) porosity change;
j) opacity change;
k) absorbency change;
l) effluent BOD change;
m) effluent COD change;
n) effluent TOC change;
o) extractives reduction;
p) refining energy reduction;
q) drainage control;
r) picking reduction; and
s) improving the pulp and paper machine cleanliness;

Unless indicated otherwise % herein are by weight.

EXAMPLES

Figure 1:
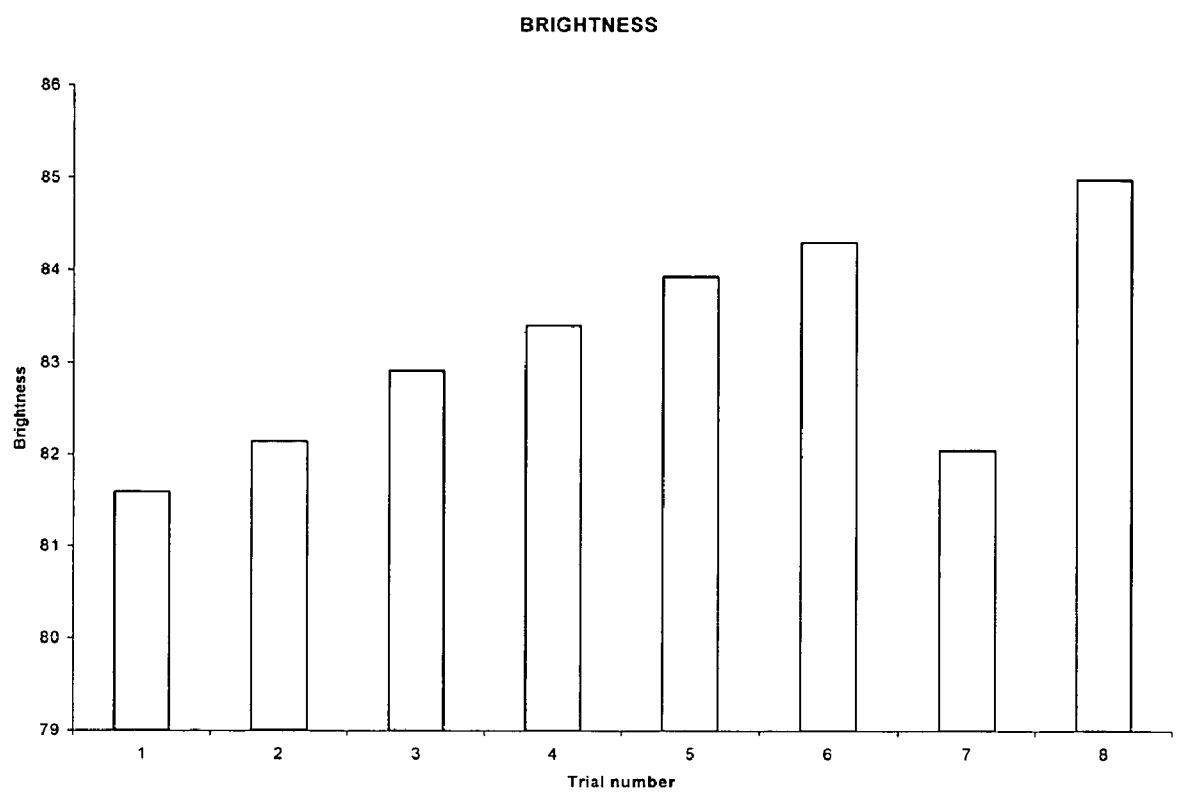
FIG. 1 shows brightness results in trials of deinking of pulp in accordance with the invention and in comparison trials.

In examples 1 and 2 the invention is illustrated by enzymes from the same class—hydrolases. Example 3 is presenting the interaction of enzymes from two other different classes—lyases and oxidoreductases.

EXAMPLE 1

A laboratory series of tests was performed with the following materials and methods:

Furnish: 175 g a.d. waste paper: 35% mixed office paper (61.25 g a.d.), 35% sorted office paper (61.25 g a.d.), 20% manifold colored ledger (35.00 g a.d.), 10% coated book (17.50 g a.d.).

Pulper simulation: Hobart N-50 mixer bowl immersed in a constant temperature bath obtained with a 120 volts, 640 watts Watlow heating belt (0-165° C.). All trials (control/standard/with enzymes) were made at 14% pulp consistency (by adding 1075 g tap water to the 175 g a.d. of waste paper) and 42° C. pulp temperature, at 200 rpm for 30 minutes.

Control (trial 1)—was performed without chemical addition in the pulper.

Standard (trial 2)—was performed only with 0.73% dry caustic soda (2.54 g of 50% solution) addition in the pulper.

Enzyme trials were performed with pulper additions of Trizym M27 (—Tri-Tex) a product containing amylase and cellulase activities at the following levels:

trial 3—0.01% (0.018 g as is),
trial 4—0.02% (0.035 g as is),
trials 5 and 8—0.03% (0.053 g as is),
trial 6—0.04% (0.07 g as is).

Also, trials 7 and 8 had additions of 0.01% (0.018 g as is) Trizym RX3— (Tri-Tex) a product containing ester hydrolase activities.

The slurry pH was monitored with a VWR Scientific Ph-meter (model 8000). It had a constant 7.6 value for all trials except the standard (caustic) which had values of 10.9.

Dump chest simulation: Mixing at 500 rpm with a Caframo stirrer RZR50. All trials were made at 4% pulp consistency (by adding 3125 g tap water to the 1250 g of slurry) and around 40° C. pulp temperature for 15 minutes.

First flotation and washing stage simulation: Lamort 171 laboratory flotation deinking cell with 1.25% pulp consistency (by adding 9625 g tap water to the slurry), maintained at 38° C., for 12 minutes at 1100 rpm. Filtration with 150 micron mesh and removal of water with a Bock centrifuge extractor (BC-150) for 5 minutes.

Disperger simulation: Hobart N-50 mixer bowl immersed in a constant temperature bath obtained with a 120 volts, 640 watts Watlow heating belt (0-165° C.). In this stage the bowl is covered with a leakproof cover, allowing the mixer to function at maximum speed with the slurry being confined in the bowl. Pulp consistencies were maintained at 5% (by adding water to a final pulp weight of 3500 g) at 80° C. for 15 minutes. In all trials 0.01% (0.018 g) of surfactant (Resolution 4250-EKA Chemicals) were added at the beginning of this stage.

Second flotation and thickening simulation: Lamort 171 laboratory flotation deinking cell with 1.50% pulp consistency (by adding 8167 g tap water), maintained at 60° C., for 12 minutes at 1100 rpm. Filtration with 150 micron mesh and removal of water to 12% consistency (for a final pulp weight of 1458 g).

Bleaching simulation: In all trials, 1% dry sodium hypochlorite (8.8 g of 12% solution for a pulp yield of 60% reaching this stage) was left to react with the pulp for 60 minutes at 50° C. 10 handsheets/trial were prepared for the optical analysis according to TAPPI T 218.

Optical results testing was made with Technidyne Micro TB-1C for diffuse brightness according to TAPPI T 525 (specular gloss excluded), and KAPTRA Vision 9000+ for Equivalent Black Area (EBA PPM) according to TAPPI T 563, 20 hours after sheet preparation.

Trials 1 and 2 simulate traditional deinking methods (surfactant only and surfactant+caustic soda)

Trials 3,4,5,6 simulate conventional enzymatic deinking.

Trial 7 simulates deinking with ink/toner degrading enzymes

Trial 8 shows the synergy between conventional enzymatic deinking and ink/toner degrading enzymes. Results show that by combining the enzymes present in trials 5 and 7 results are improved in relation to trial 6. Enzyme dosages in trial 8 are the same per pulp weight as in trial 6. At the same time the simple average between trials 5 and 7 results could have not predicted the results of trial 8.

Figure 2:
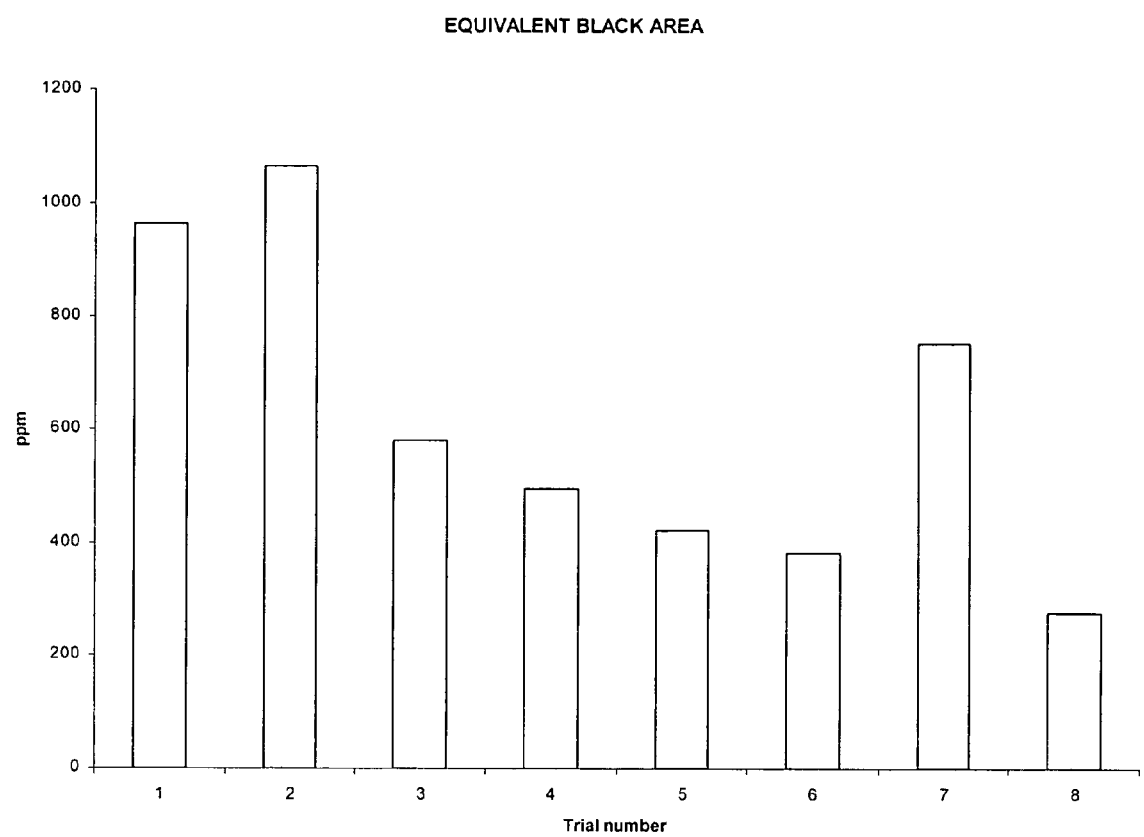
FIG. 2 shows equivalent black area results for the trials of FIG. 1.

The results of the first series of tests are presented below in Table I and in FIGS. 1 and 2:

TABLE I

| Trial number | % Product trade name in pulper | % Product chemical name in pulper | Final brightness | EBA PPM |
|---|---|---|---|---|
| 1 | No chemical in pulper | No chemical in pulper | 81.59 | 965 |
| 2 | 0.75% Caustic soda | 0.75% Caustic soda | 82.14 | 1064 |
| 3 | 0.01% Trizym M27 | 0.01% cellulase + amylase | 82.91 | 579 |
| 4 | 0.02% Trizym M27 | 0.02% cellulase + amylase | 83.40 | 495 |
| 5 | 0.03% Trizym M27 | 0.03% cellulase + amylase | 83.93 | 423 |
| 6 | 0.04% Trizym M27 | 0.04% cellulase + amylase | 84.30 | 381 |
| 7 | 0.01% Trizym RX3 | 0.01% ester hydrolases | 82.05 | 753 |
| 8 | 0.03% Trizym M27 0.01% Trizym RX3 | 0.03% cellulase + amylase and 0.01% ester hydrolases | 84.98 | 275 |

EXAMPLE 2

A laboratory series of tests was performed with the following materials and methods:

Furnish: 175 g a.d. waste paper: 75% mixed office paper (131.25 g a.d.), 20% manifold colored ledger (35.00 g a.d.), 5% old newspaper (8.75 g a.d.).

Pulper simulation: Hobart N-50 mixer bowl immersed in a constant temperature bath obtained with a 120 volts, 640 watts Watlow heating belt (0-165° C.). All trials (control/standard/with enzymes) were made at 14% pulp consistency (by adding 1075 g tap water to the 175 g a.d. of waste paper) and 42° C. pulp temperature, at 200 rpm for 30 minutes.

Control (trial 1)—was performed without chemical addition in the pulper.

Standard (trial 2)—was performed only with 0.73% dry caustic soda (2.54 g of 50% solution) addition in the pulper.

Enzyme trials were performed with pulper additions of Trizym DE 16 (trade-mark) of Tri-Tex, a product containing amylase activities at the following levels: trial 3—0.01% (0.018 g as is), trial 4—0.02% (0.035 g as is), trials 5 and 8—0.03% (0.053 g as is), trial 6—0.04% (0.07 g as is). Also, trials 7 and 8 had additions of 0.01% (0.018 g as is) Trizym RX3 (trade-mark) of Tri-Tex, a product containing ester hydrolase activities.

The slurry pH was monitored with a VWR Scientific pH-meter (model 8000). It had a constant 7.4 value for all trials except the standard (caustic) which had values of 10.7.

Dump chest simulation: Mixing at 500 rpm with a Caframo stirrer RZR50. All trials were made at 4% pulp consistency (by adding 3125 g tap water to the 1250 g of slurry) and around 40° C. pulp temperature for 15 minutes.

First flotation and washing stage simulation: Lamort 171 (trade-mark) laboratory flotation deinking cell with 1.25% pulp consistency (by adding 9625 g tap water to the slurry), maintained at 38° C., for 12 minutes at 1100 rpm. Filtration with 150 micron mesh and removal of water with a Bock centrifuge extractor (BC-150) for 5 minutes.

Disperger simulation: Hobart N-50 mixer bowl immersed in a constant temperature bath obtained with a 120 volts, 640 watts Watlow heating belt (0-165° C.). In this stage the bowl is covered with a leakproof cover, allowing the mixer to function at maximum speed with the slurry being confined in the bowl. Pulp consistencies were maintained at 5% (by adding water to a final pulp weight of 3500 g) at 80° C. for 15 minutes. In all trials 0.01% (0.018 g) of surfactant (Resolution 4250 (trade-mark), EKA Chemicals) were added at the beginning of this stage.

Second flotation and thickening simulation: Lamort 171 laboratory flotation deinking cell with 1.50% pulp consistency (by adding 8167 g tap water), maintained at 60° C., for 12 minutes at 1100 rpm. Filtration with 150 micron mesh and removal of water to 12% consistency (for a final pulp weight of 1458 g).

Bleaching simulation: In all trials, 1% dry sodium hypochlorite (8.8 g of 12% solution for a pulp yield of 60% reaching this stage) was left to react with the pulp for 60 minutes at 50° C. 10 handsheets/trial were prepared for the optical analysis according to TAPPI T 218.

Optical results testing was made with Technidine Micro TB-1C for diffuse brightness according to TAPPI T 525, and KAPTRA Vision 9000+ for Equivalent Black Area (EBA) according to TAPPI T 563, 20 hours after handsheet preparation.

Trials 1 and 2 simulate traditional deinking methods (surfactant only and surfactant+caustic soda)

Trials 3,4,5,6 simulate conventional enzymatic deinking.

Trial 7 simulates deinking with ink/toner degrading enzymes

Trial 8 shows the synergy between conventional enzymatic deinking and ink/toner degrading enzymes. Results show that by combining the enzymes present in trials 5 and 7 results are improved in relation to trial 6. Enzyme dosages in trial 8 are the same per pulp weight as in trial 6. At the same time the simple average between trials 5 and 7 results could have not predicted the results of trial 8.

Figure 3:
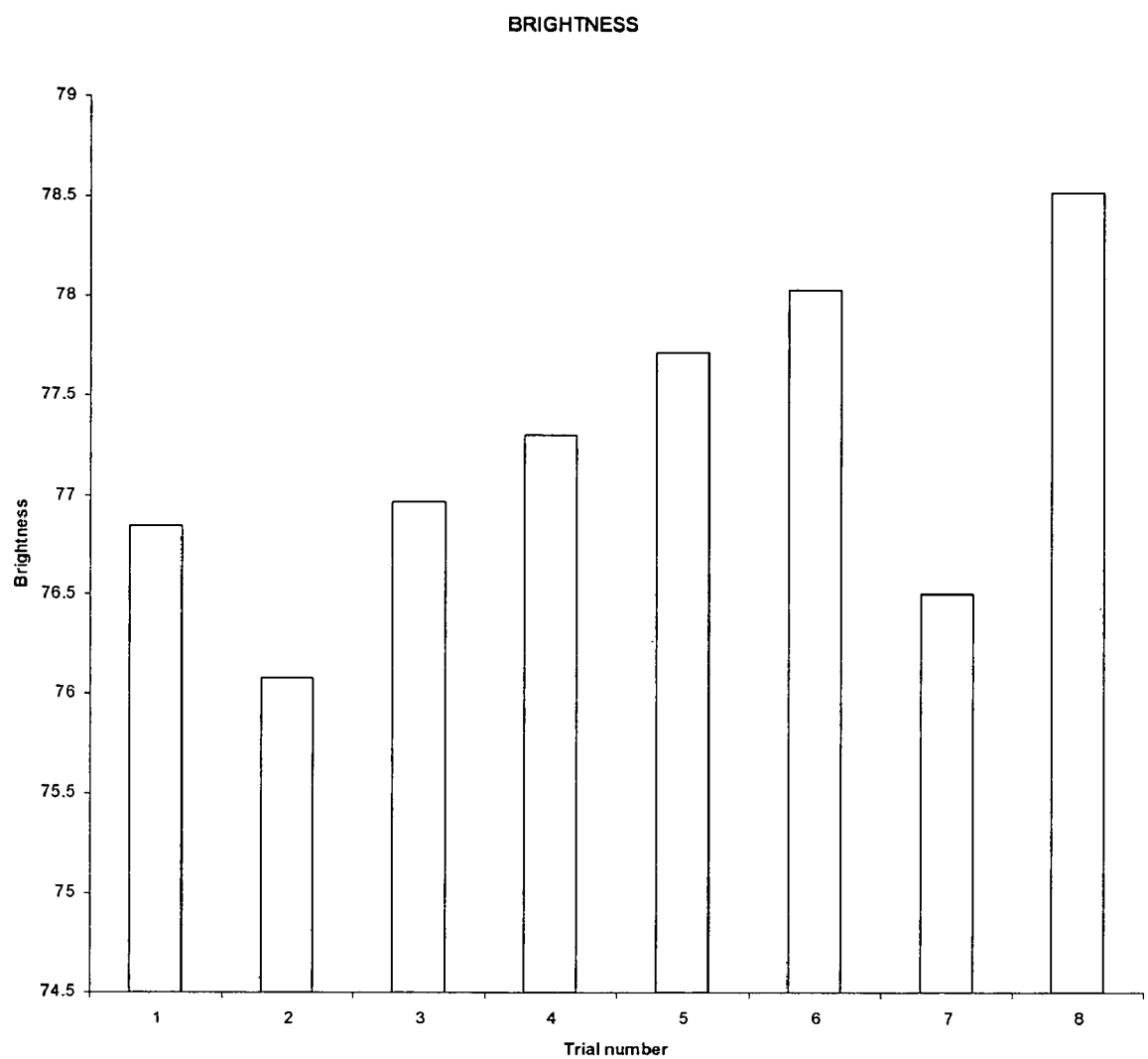
FIG. 3 shows brightness results similar to FIG. 1 but for a different set of trials.
Figure 4:
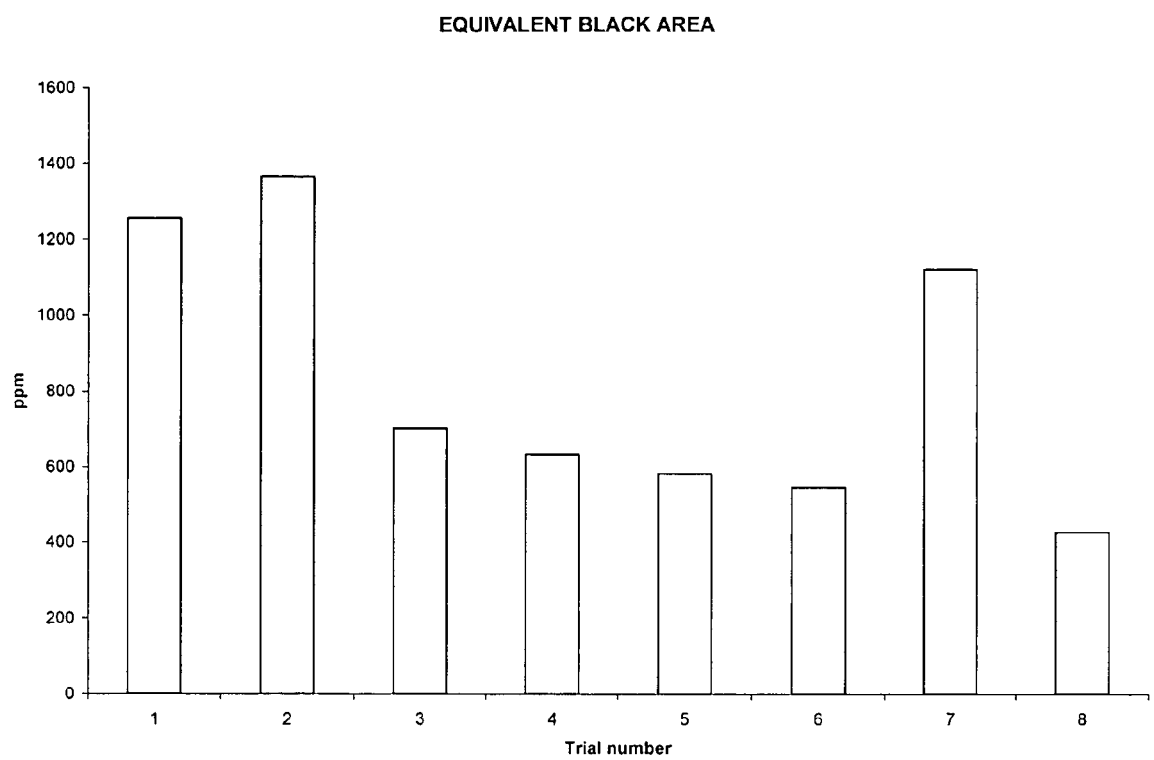
FIG. 4 shows equivalent black area results for the trials of FIG. 3.

The results of the second series of tests are presented in Table II below and in FIGS. 3 and 4:

| Trial number | % Product trade name in pulper | % Product chemical name in pulper | Final brightness | EBA PPM |
|---|---|---|---|---|
| 1 | No chemical in pulper | No chemical in pulper | 76.85 | 1254 |
| 2 | 0.75% Caustic soda | 0.75% Caustic soda | 76.08 | 1365 |
| 3 | 0.01% Trizym DE16 | 0.01% amylase | 76.97 | 703 |
| 4 | 0.02% Trizym DE16 | 0.02% amylase | 77.30 | 634 |
| 5 | 0.03% Trizym DE16 | 0.03% amylase | 77.71 | 583 |
| 6 | 0.04% Trizym DE16 | 0.04% amylase | 78.03 | 547 |
| 7 | 0.01% Trizym RX3 | 0.01% ester hydrolases | 76.50 | 1120 |
| 8 | 0.03% Trizym DE16 0.01% Trizym RX3 | 0.03% amylase 0.01% ester hydrolases | 78.51 | 427 |

EXAMPLE 3

A laboratory series of tests was performed with the following materials and methods: Furnish: 175 g a.d. waste paper: 90% mixed office paper (157.50 g a.d.), 10% old newspaper (17.50 g a.d.).

Pulper simulation: Hobart N-50 mixer bowl immersed in a constant temperature bath obtained with a 120 volts, 640 watts Watlow heating belt (0-165° C.). All trials (control/standard/with enzymes) were made at 14% pulp consistency (by adding 1075 g tap water to the 175 g a.d. of waste paper) and 42° C. pulp temperature, at 200 rpm for 30 minutes.

Control (trial 1)—was performed without chemical addition in the pulper.

Standard (trial 2)—was performed only with 0.73% dry caustic soda (2.54 g of 50% solution) addition in the pulper.

Enzyme trials were performed with pulper additions of Trizym M35—Tri-Tex product contained pectate lyases activity at the following levels:

trial 3—0.015% (0.027 g as is), trial 4—0.030% (0.054 g as is), trials 5 and 8—0.045% (0.081 g as is), trial 6—-0.060% (0.108 g as is), Also, trials 7 and 8 had additions of 0.007% (0.0126 g as is) Trizym R11-Tri-Tex product containing oxidase activities.

The slurry pH was monitored with a VWR Scientific pH-meter (model 8000). It had a constant 7.3 value for all trials except the standard (caustic) which had values of 10.7.

Dump chest simulation: Mixing at 500 rpm with a Caframo RZR50 (trade-mark) stirrer. All trials were made at 4% pulp consistency (by adding 3125 g tap water to the 1250 g of slurry) and around 40° C. pulp temperature for 15 minutes.

Flotation, washing and thickening stage simulation: Lamort 171 (trade-mark) laboratory flotation deinking cell with 1.25% pulp consistency (by adding 9625 g tap water to the slurry), maintained at 38° C., for 12 minutes at 1100 rpm. Filtration with 150 micron mesh and removal of water to 12% consistency (for a final pulp weight of 1458 g).

Bleaching simulation: In all trials, 1% dry sodium hypochlorite (9.7 g of 12% solution for a pulp yield of 66% reaching this stage) was left to react with the pulp for 60 minutes at 50° C. 10 handsheets/trial were prepared for the optical analysis according to TAPPI T 218.

Optical results testing was made with Technidyne Micro TB-1C for diffuse brightness according to TAPPI T 525 (specular gloss excluded), and KAPTRA Vision 9000+ for Equivalent Black Area (EBA PPM) according to TAPPI T 563, 20 hours after sheet preparation.

Trials 1 and 2 simulate traditional deinking methods (no chemicals and caustic soda only)

Trials 3, 4, 5, 6 simulate conventional enzymatic deinking.

Trial 7 simulates deinking with ink/toner degrading enzymes.

Trial 8 shows the synergy between conventional enzymatic deinking and ink/toner degrading enzymes. Results show that by combining the enzymes present in trials 5 and 7 results are improved in relation to trial 6. Enzyme dosage in trial 8 are less per pulp weight vs. trial 6. At the same time the simple average between trials 5 and 7 results could have not predicted the results of trial 8.

Figure 5:
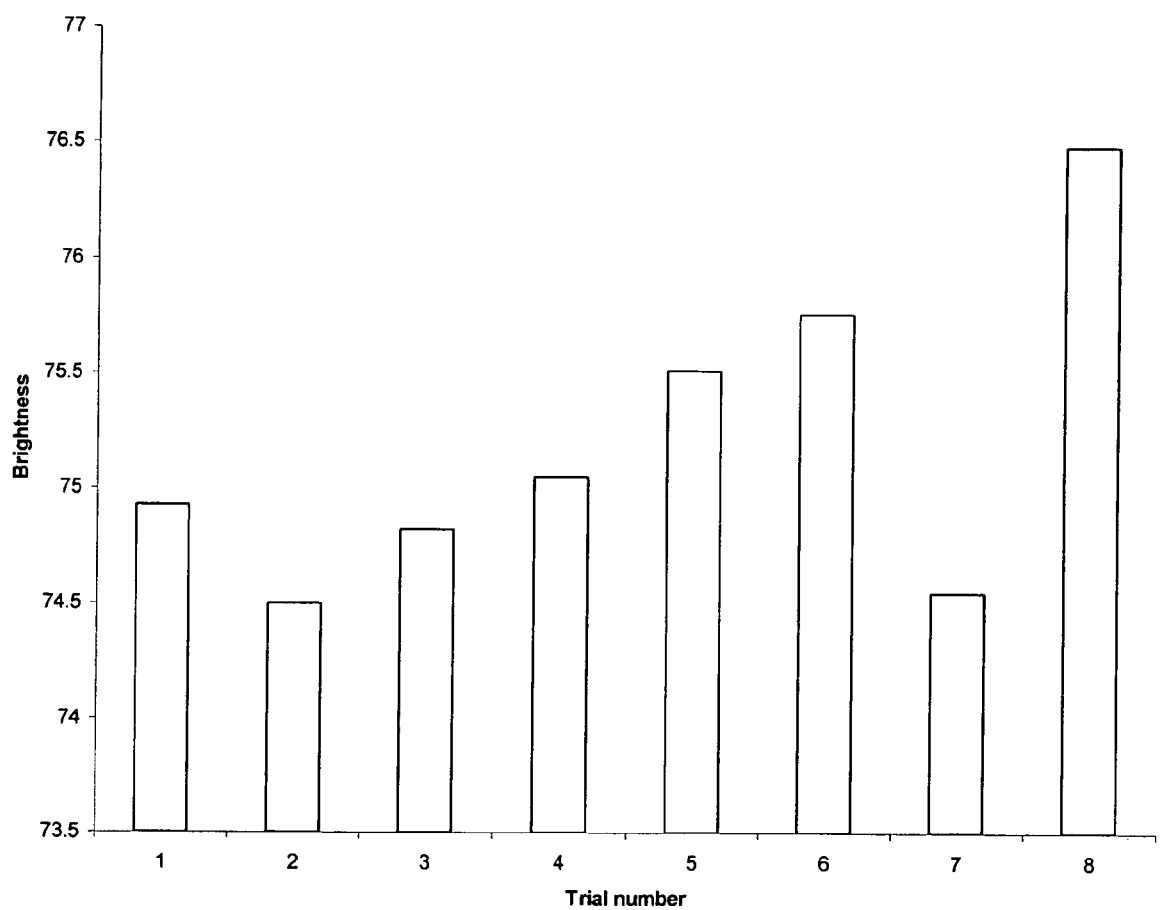
FIG. 5 shows brightness results for different trials of Ex. 3.
Figure 6:
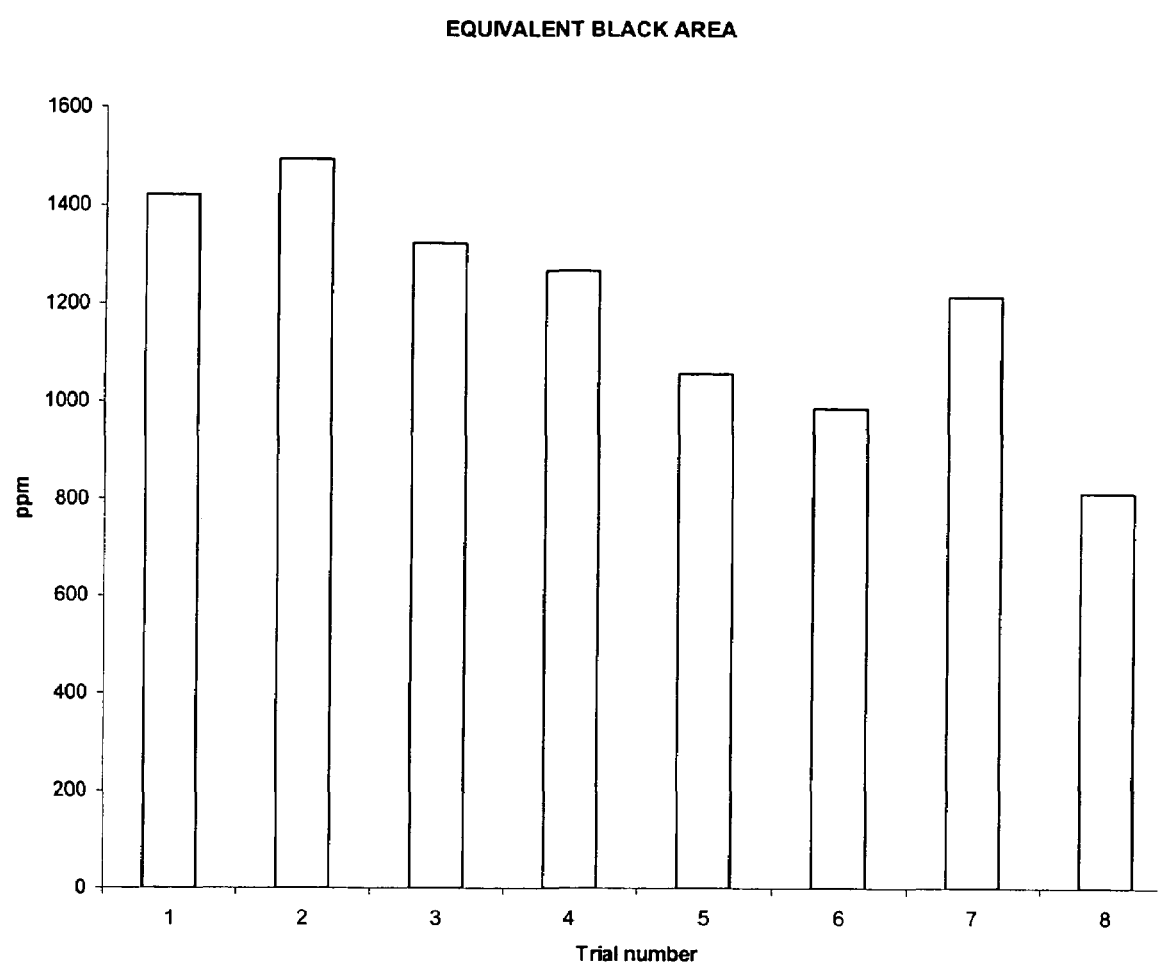
FIG. 6 shows equivalent black area results for the trials of FIG. 5.

The results of the first series of tests are presented below in Table III and in FIGS. 5 and 6:

TABLE III

| Trial number | % Product trade name in pulper | % Product chemical name in pulper | Final brightness | EBA PPM |
|---|---|---|---|---|
| 1 | No chemical in pulper | No chemical in pulper | 74.93 | 1421 |
| 2 | 0.75% Caustic soda | 0.75% Caustic soda | 74.50 | 1493 |
| 3 | 0.015% Trizym M35 | 0.015% pectate-lyase | 74.82 | 1321 |
| 4 | 0.030% Trizym M35 | 0.030% pectate-lyase | 75.05 | 1267 |
| 5 | 0.045% Trizym M35 | 0.045% pectate-lyase | 75.51 | 1055 |
| 6 | 0.060% Trizym M35 | 0.060% pectate-lyase | 75.76 | 985 |
| 7 | 0.007% Trizym RM11 | 0.007% oxidases | 74.55 | 1213 |
| 8 | 0.045% Trizym M35 0.007% Trizym RM11 | 0.045% pectate-lyase 0.007% oxidases | 76.48 | 812 |

The invention claimed is:

1. A method for deinking of waste paper pulp comprising:
  i) contacting a pulp of waste paper with at least a first enzyme which acts to dislodge ink and toner from the pulp, and at least a second enzyme which acts to disperse ink and toner in the pulp,
  ii) deinking said pulp with said enzymes, and,
  iii) recovering a deinked pulp,
    said first enzyme being selected from the group consisting of cellulases, amylases, pectinases, pullulanases, hemicellulases, proteases; glucose oxidase, cyclodextrin transferase, glycosyltransferase, pectate-lyase, glucose isomerase, and mixtures thereof and acting on at least one of:
  a) internal and surface substrates of said pulp, and
  b) interfacial substrates between the paper and ink and toner of the pulp, to dislodge ink and toner from said pulp; and said second enzyme is selected from the group consisting of 2,4-pentanedione hydrolase, a polyvinyl alcohol oxidase and mixtures thereof, and acts to disperse substrates present in ink and toner in said pulp.

2. The method according to claim 1 wherein said pulp is contacted simultaneously with said first and second enzymes.

3. The method according to claim 1 wherein said first and second enzymes are contacted with said pulp, in admixture.

4. The method according to claim 1, wherein said second enzyme is selected from the group consisting of 2,4-pentanedione hydrolase.

5. The method according to claim 1, wherein said enzymes are added prior to a pulping stage forming said pulp.

6. The method according to claim 1, wherein said enzymes are added during a pulping stage forming said pulp.

7. The method according to claim 1, wherein said enzymes are added after a pulping stage forming said pulp.

8. The method according to claim 1, wherein said first and second enzyme we added in the same or different stages.

9. A method according to claim 1, wherein said contacting is at a temperature between about 0° C. and about 80° C.

10. A method according to claim 1, wherein said contacting is at a temperature between about 25° C. and about 65° C.

11. The method according to claim 9, wherein said contacting is conducted at a pH of about 3 to about 11.

12. The method according to claim 10, wherein said contacting is conducted at a pH of about 5 to about 10.

13. The method according to claim 11, wherein said contacting is conducted in a pulp furnish having a consistency between dry furnish to 0.5% pulp.

14. The method according to claim 13, wherein said contacting is conducted in a pulp furnish having a consistency of 1 to 20%.

15. The method according to claim 13, wherein said contacting is for a time between about 1 minute to about 4 weeks.

16. The method according to claim 14, wherein said contacting is for a time between about 5 minutes to about 4 hours.

17. The method according to claim 15, wherein the waste paper is printed or unprinted waste paper, waste paper containing ONP (old newspapers) waste paper containing OWP (office waste papers) waste paper containing OMG (old magazines), HGD (high grade paper) MP (mixed paper), PS (pulp substitutes) and mixtures thereof.

18. The method according to claim 17 wherein said waste paper is a waste paper grade selected from: news, special news, special news de-ink quality, over-issue news, magazines, mixed groundwood shaving, telephone directory, white blank news, groundwood computer printout, publication blanks, flyleaf shavings, hard white shavings, hard white envelope cutting, new coloured envelope cutting, semi-bleached cuttings, manila tabulating cards, sorted office paper, mixed office paper, sorted coloured ledger, manifold coloured ledger, sorted white ledger, manifold white ledger, computer printout, coated groundwood sections, printed bleached board cuttings, misprint bleached board, unprinted bleached board, bleach cup stock, printed bleached cup stock, unprinted bleached plate stock, printed bleached plate stock, super mixed paper, box board cuttings, and mill wrappers.

19. The method according to claim 1, wherein said internal and surface paper substrates selected as target for enzymatic action are a) substrates originating directly or indirectly from wood selected from cellulose, oligosaccharides, cellobiose, glucose, hemicellulose, xylans, mannans, glucomannans, galactomannans, pectins and lignin, and b) substrates added directly or indirectly dining pulp and paper production selected from amylose, amylopectin, maltose, glucose and rosin.

20. The method according to claim 1, wherein said interfacial substrates selected as target for enzymatic action are substrates added directly or indirectly during pulp and paper production selected from: amylose, amylopectin, maltose, glucose, synthetic binders, polyvinyl acetates, ethylvinyl acetate and polyvinyl alcohol.

21. The method according to claim 1, wherein said second enzyme acts on substrates selected from: ester components of rosin, shellac, alkyd esters, styrene-acrylics, acrylamide resins, acrylics, polyvinyl acetates, polyesters, polyester imides, fatty acid monoesters of vegetable origin, drying oils, hydrated castor oil, esters of medium sized alcohols with phthalic acid, citric acid, stearic acid and polyvinyl alcohol.

22. The method according to claim 1, wherein the first enzyme comprises an enzyme acting on a) and is added in an amount of at least 0.00001%, by weight, catalytic protein, based on the dry waste paper weight.

23. The method according to claim 22, wherein the first enzyme comprises an enzyme acting on b) and is added in an amount of at least minimum 0.00001%, by weight catalytic protein, based on the dry waste paper weight.

24. The method according to claim 23, wherein the second enzyme is added in an amount of at least 0.00001%, by weight, catalytic protein, based on the dry waste paper weight.

25. The method according to claim 24, wherein enzymatic action of said first and second enzymes is assisted by chemical mediators.

26. The method according to claim 24, wherein at least one deinking chemical is also added to the pulp for deinking.

27. The method according to claim 26, wherein the at least one deinking chemical is a surfactant.

28. The method according to claim 26, wherein the at least one deinking chemical is caustic soda.

29. A method according to claim 18, further comprising: adding to said pulp an enzyme for bleaching or decolorizing purposes acting on substrates present in ink and toner, dyes and pigments.

30. The method according to claim 26, wherein the at least one deinking chemical is sodium silicate.

31. The method according to claim 26, wherein the at least one deinking chemical is a solvent.

32. The method according to claim 26, wherein the at least one deinking chemical is a polymer.

33. The method according to claim 26, wherein the at least one deinking chemical is sodium carbonate.

34. A method according to claim 26, wherein the at least one deinking chemical is a bleaching or discolorizing chemical used in oxidation or reduction systems, and is selected from oxygen, ozone, hydrogen peroxide, sodium hypochlorite, chlorine dioxide, sodium hydrosulfite and FAS.

35. The method according to claim 24, further comprising: adding to said pulp an enzyme for bleaching or decolorizing purposes, acting on substrates present in ink and toner compounds, dyes and pigments.

36. A method according to claim 24 wherein said first enzyme comprises a cellulase, an amylase, a pectate lyase or a mixture of two or more thereof; and said second enzyme comprises 2,4-pentanedione hydrolase, a polyvinyl alcohol oxidase or a mixture thereof.

37. A method according to claim 18 wherein said first enzyme comprises a cellulase, an amylase or pectate lyase or mixtures thereof, and said second enzyme comprises 2,4-pentanedione hydrolase, a polyvinyl alcohol oxidase or mixtures thereof.

38. A method according to claim 1 wherein said contacting is in an aqueous vehicle containing said pulp and said second enzyme disperses ink and toner from the pulp into the aqueous vehicle.

39. A method according to claim 24, further comprising adding a specific enzyme for a purpose selected from:
a) yield increase;
b) ash or first pass retention change;
c) cationic demand reduction;
d) fibre strength change;
e) bulk change;
f) softness change;
g) stickies reduction;
h) friction coefficient change;
i) porosity change;
j) opacity change;
k) absorbency change;
l) effluent BOD change;
m) effluent COD change;
n) effluent TOC change;
o) extractives reduction;
p) refining energy reduction;
q) drainage control;
r) picking reduction; and
s) improving the pulp and paper machine cleanliness.

40. A method according to claim 1, wherein said first enzyme comprises a cellulase and an amylase.

41. A method according to claim 1, wherein said first enzyme comprises an amylase.

42. A method according to claim 1, wherein said first enzyme comprises a pectate-lyase.

* * * * *